United States Patent
Nishizawa et al.

(10) Patent No.: US 8,999,048 B2
(45) Date of Patent: Apr. 7, 2015

(54) EXHAUST GAS PURIFYING APPARATUS FOR DIESEL ENGINE (75) Inventors: Toru Nishizawa, Fujusawa (JP); Risa Yamamoto, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 147 days.

(21) Appl. No.: 13/805,526

(22) PCT Filed: May 20, 2011

(86) PCT No.: PCT/JP2011/002812
§ 371 (c)(1),
(2), (4) Date: Dec. 19, 2012

(87) PCT Pub. No.: WO2011/161872
PCT Pub. Date: Dec. 29, 2011

(65) Prior Publication Data
US 2013/0092030 A1 Apr. 18, 2013

(30) Foreign Application Priority Data
Jun. 25, 2010 (JP) .................. 2010-144512

(51) Int. Cl.
*B01D 50/00* (2006.01)
*B01D 39/06* (2006.01)
(Continued)

(52) U.S. Cl.
CPC ............ *F01N 3/0238* (2013.01); *F02D 41/029* (2013.01); *F02D 41/042* (2013.01); *F02N 11/0829* (2013.01); *F01N 3/021* (2013.01); *F02D 41/065* (2013.01); *F02D 41/1448* (2013.01); *F02D 41/405* (2013.01); *F02D 2200/0802* (2013.01); *F02M 25/0707* (2013.01); *F02N 2200/026* (2013.01); *Y02T 10/48* (2013.01)

(58) Field of Classification Search
CPC ............... B01D 46/04; B01D 46/4272; B01D 46/0068; Y02T 110/47; F02D 41/029; F02D 41/08; F01N 9/002
USPC ........................................... 95/425
See application file for complete search history.

(56) References Cited

U.S. PATENT DOCUMENTS 4,719,751 A * 1/1988 Kume et al. .............. 60/285
4,969,328 A * 11/1990 Kammel .................. 60/275
(Continued)

FOREIGN PATENT DOCUMENTS

CN 1423035 A 6/2003
CN 101006262 A 7/2007
(Continued)

*Primary Examiner* — Amber Orlando
(74) *Attorney, Agent, or Firm* — Foley & Lardner LLP (57) ABSTRACT

An exhaust gas purifying apparatus for a diesel engine includes a diesel particulate filter (DPF) in an exhaust system in the diesel engine. The exhaust gas purifying apparatus is constructed to execute regeneration of the DPF by raising a temperature of the DPF in a case where a predetermined DPF regeneration condition is fulfilled, interrupt the regeneration of the DPF, execute idling stop, automatically restart the diesel engine and then restart the regeneration of the DPF, and when shifting to the idling operation is carried out during regeneration of the DPF, delay execution of the idling stop until a temperature of the DPF at a time at which the idling stop is started becomes not less than a temperature of the DPF at a time at which shifting to an idling operation is carried out even in a case where the predetermined idling stop condition is fulfilled.

10 Claims, 8 Drawing Sheets

(51) Int. Cl.

| | | |
|---|---|---|
| *B01D 39/14* | (2006.01) | |
| *B01D 39/20* | (2006.01) | |
| *B01D 24/00* | (2006.01) | |
| *B01D 49/00* | (2006.01) | |
| *B01D 39/00* | (2006.01) | |
| *B01D 41/00* | (2006.01) | |
| *B01D 45/00* | (2006.01) | |
| *B01D 46/00* | (2006.01) | |
| *B01D 51/00* | (2006.01) | |
| *F01N 3/023* | (2006.01) | |
| *F02D 41/02* | (2006.01) | |
| *F02D 41/04* | (2006.01) | |
| *F02N 11/08* | (2006.01) | |
| *F01N 3/021* | (2006.01) | |
| *F02D 41/06* | (2006.01) | |
| *F02D 41/14* | (2006.01) | |
| *F02D 41/40* | (2006.01) | |
| *F02M 25/07* | (2006.01) | |

(56) References Cited

U.S. PATENT DOCUMENTS

| | | | |
|---|---|---|---|
| 6,802,180 B2 | 10/2004 | Gabe et al. | |
| 8,181,619 B2 | 5/2012 | Magarida et al. | |
| 8,240,295 B2 * | 8/2012 | Yang | 123/568.19 |
| 2005/0166580 A1 * | 8/2005 | Pfaeffle et al. | 60/295 |
| 2006/0016177 A1 * | 1/2006 | Tsutsumoto et al. | 60/295 |
| 2007/0214778 A1 * | 9/2007 | Narita et al. | 60/299 |
| 2008/0000219 A1 * | 1/2008 | Ratcliff et al. | 60/274 |
| 2009/0082938 A1 * | 3/2009 | Onodera et al. | 701/103 |
| 2011/0146246 A1 * | 6/2011 | Farman et al. | 60/286 |

FOREIGN PATENT DOCUMENTS

| | | |
|---|---|---|
| JP | 2002-357117 A | 12/2002 |
| JP | 2003-278575 A | 10/2003 |
| JP | 2004-150416 A | 5/2004 |
| JP | 2006-291850 A | 10/2006 |
| JP | 4012043 B2 | 11/2007 |

\* cited by examiner

EXHAUST GAS PURIFYING APPARATUS FOR DIESEL ENGINE

TECHNICAL FIELD

The present invention relates to an exhaust gas purifying apparatus for a diesel engine that carries out idling stop, and particularly relates to regeneration of a diesel particulate filter (hereinafter also referred to as a DPF).

BACKGROUND ART

Patent Literature 1 discloses a diesel engine capable of carrying out idling stop in which the diesel engine is automatically stopped during an idling operation. In the diesel engine of the conventional art, when shifting to an idling operation is carried out during execution of regeneration of a DPF by post injection, idling stop is prohibited until regeneration of the DPF is terminated, and regeneration of the DPF is continued during the idling operation. The reason therefor is that in a case where idling stop is carried out during regeneration of the DPF and regeneration of the DPF is interrupted, a remarkable drop of the temperature of the DPF is caused to thereby necessitate a prolonged time and large energy until regeneration of the DPF is terminated.

CITATION LIST

Patent Literature

Patent Literature 1: Japanese Patent No. 4012043

SUMMARY OF INVENTION

Technical Problem

However, in such a conventional art as described above, opportunity and frequency of conducting idling stop is necessarily reduced, thereby lowering an effect of enhancing exhaust gas purification and fuel economy by conducting the idling stop.

In the above conventional art, it is described that the temperature of the DPF is remarkably dropped in a case where shifting to idling stop is conducted during regeneration of the DPF. However, as a result of intensive researches, inventors of the present invention have found the following. That is, in a case where shifting to the idling operation is actually carried out during regeneration of the DPF, the temperature of the DPF has been already raised to the regeneration allowable temperature value because regeneration of the DPF has been conducted until immediately before the shifting to the idling operation. Further, since an oxygen concentration becomes higher owing to a high excess air ratio during the idling operation, oxidation reaction of a particulate matter (hereinafter also referred to as a PM) such as soot which remains in the DPF is promoted to cause a temporary rise of the temperature of the DPF. After that, the temperature of the DPF is dropped.

Solution to Problem

In one aspect of the present invention, there is provided an exhaust gas purifying apparatus for a diesel engine, the diesel engine conducting idling stop to automatically stop the diesel engine in a case where a predetermined idling stop condition is fulfilled, the exhaust gas purifying apparatus including:

a diesel particulate filter (DPF) disposed in an exhaust system in the diesel engine to trap a particulate matter in exhaust gas discharged from the diesel engine;

a DPF regeneration section that executes regeneration of the DPF by raising a temperature of the DPF in a case where a predetermined DPF regeneration condition is fulfilled;

a DPF regeneration interruption and restart section that interrupts the regeneration of the DPF, executes idling stop, automatically restarts the diesel engine and then restarts the regeneration of the DPF; and an idling stop delay section that delays execution of the idling stop until a temperature of the DPF at a time at which the idling stop is started becomes not less than a temperature of the DPF at a time at which shifting to an idling operation is carried out even in a case where the predetermined idling stop condition is fulfilled, when shifting to the idling operation is carried out during the regeneration of the DPF.

Effects of Invention

The exhaust gas purifying apparatus for a diesel engine according to the present invention is constructed such that, in a case where shifting to idling operation is carried out during regeneration of the DPF, the regeneration of the DPF is temporarily interrupted, and execution of idling stop is delayed so as to increase the temperature of the DPF, that is, idling stop is executed after the idling operation is continued during a predetermined delay time. With this construction, it is possible to allow the DPF to have a high temperature upon starting the idling stop. A gas flow passing through the DPF is not generated during the idling stop, and therefore, a large drop of the temperature of the DPF is avoided. After the subsequent automatic restart of the diesel engine, the temperature of the DPF is kept at a relatively high value. As a result, it is possible to quickly restart regeneration of the DPF and reduce a time and an energy which are required for raising the temperature of the DPF to the regeneration allowable temperature value.

As described above, the exhaust gas purifying apparatus for a diesel engine according to the present invention is constructed such that, in a case where shifting to idling operation is carried out during regeneration of the DPF, the regeneration of the DPF is temporarily interrupted and idling stop is executed. With this construction, it is possible to prevent reduction in opportunity and frequency of execution of idling stop which results in an enhanced efficiency of exhaust gas purification and improvement in fuel economy at an initial stage by executing idling stop.

Figure 1:
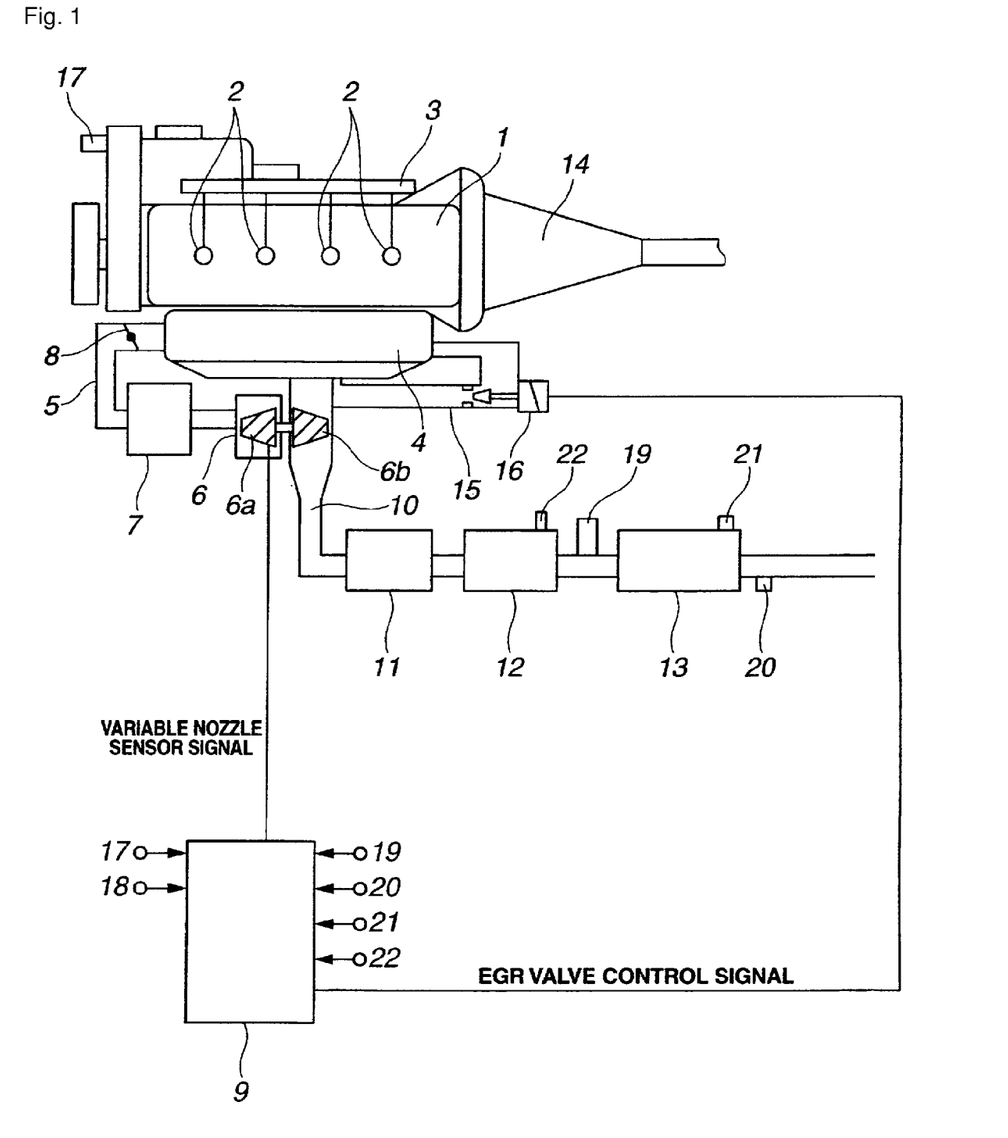
FIG. 1 is a schematic system diagram of a diesel engine to which an exhaust gas purifying apparatus according to an embodiment of the present invention is applicable.

In the following, an embodiment of the present invention is explained by referring to the accompanying drawings. FIG. 1 is a schematic system diagram of a diesel engine to which an exhaust gas purifying apparatus according to the embodiment of the present invention is applicable. In FIG. 1, reference numeral 1 denotes a diesel engine proper, reference numeral 2 denotes a fuel injection valve of respective engine cylinders, and reference numeral 3 denotes a fuel injection system having an accumulating chamber in which a high-pressure fuel is accumulated (hereinafter referred to as a common-rail fuel injection system). Reference numerals 4, 5 and 10 denote an intake collector, an intake passage and an exhaust passage, respectively. Reference numeral 9 denotes a control unit (ECU) which stores and executes various controls, such as setting of a target temperature for regeneration of diesel particulate filter (DPF) 13, control of raising a temperature of DPF 13 upon regeneration of DPF 13, etc., as explained later. Reference numeral 14 denotes a transmission which transmits a driving force of diesel engine proper 1 to a drive shaft. Transmission 14 may be a stepwise variable transmission or a continuously variable transmission.

Fuel injection valves 2 are supplied with a high-pressure fuel by common-rail fuel injection system 3. Fuel injection valves 2 are operated to open and close to inject the fuel into the corresponding engine cylinders in response to an injection signal outputted from ECU 9, respectively. Intake collector 4 is connected to respective intake ports of diesel engine proper 1. Intake passage 5 is connected to intake collector 4. Disposed in intake passage 5 are compressor 6a of variable nozzle turbocharger 6 for turbocharging from an upstream side, inter-cooler 7 for cooling an air which has a high temperature due to compression by compressor 6a, and intake throttle valve 8 which controls an amount of intake air. Disposed in exhaust passage 10 from the upstream side are turbine 6b of variable nozzle turbocharger 6, oxidation catalyst 11 supporting a noble metal which oxidizes unburned component in exhaust gas, NOx absorption catalyst 12 which traps NOx in the exhaust gas, and DPF 13 which traps particulate matter (PM) present in the exhaust gas. Exhaust gas recirculation (EGR) passage 15 is branched from an upstream side of turbine 6b in exhaust passage 10 and connected to intake collector 4. EGR valve 16 is disposed in EGR passage 15 and controls an amount of exhaust gas recirculating into the intake air in accordance with an operating condition.

Detection signals from a plurality of sensors are inputted to ECU 9. The sensors include engine speed sensor 17 which detects engine speed (engine rotation number), accelerator opening sensor 18 which detects an accelerator opening degree, exhaust gas pressure sensor 19 which detects an exhaust gas pressure between oxidation catalyst 11 and DPF 13 in exhaust passage 10 (that is, an exhaust gas pressure on the upstream side of DPF 13), exhaust air-fuel ratio sensor 20 which detects an air-fuel ratio of the exhaust gas on the downstream side of DPF 13, DPF temperature sensor 21 which detects a catalyst bed temperature of DPF 13 (i.e., a temperature of DPF 13), and temperature sensor 22 which detects a temperature of NOx absorption catalyst 12. An amount of PM trapped and accumulated in DPF 13 (i.e., a PM accumulation amount) is also inputted to ECU 9. ECU 9 calculates an opening degree of a variable nozzle vane of variable nozzle turbocharger 6 (i.e., a variable nozzle opening degree), an opening degree of EGR valve 16, an opening degree of intake throttle valve 8, and an amount of fuel to be injected by fuel injection valve 2 (i.e., a fuel injection amount), on the basis of the detection signals, and outputs signals for controlling the variable nozzle opening degree, the EGR valve opening degree, the intake throttle valve opening degree and the fuel injection amount. Further, ECU 9 determines a time of regeneration of DPF 13 and outputs a signal for actuating fuel injection valve 2 which supplies a fuel in an amount necessary to raise the exhaust gas temperature for regeneration of DPF 13.

Figure 2:
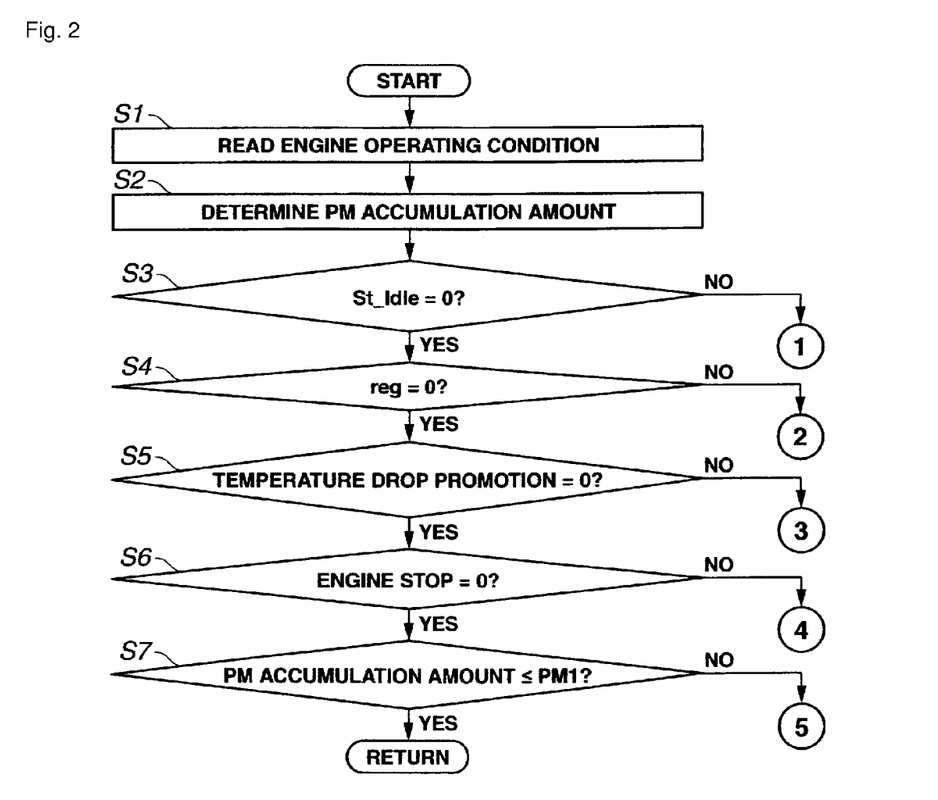
FIG. 2 is a flowchart of a routine which is executed for a DPF regeneration control according to the embodiment of the present invention.

Next, referring to FIG. 2 to FIG. 7, control of regeneration of DPF 13, particularly, control of regeneration of DPF 13 and interruption of the regeneration in a case where idling stop is to be carried out, is explained. FIG. 2 is a flowchart of a main routine for controlling regeneration of DPF 13 which is executed by ECU 9. This routine is repeatedly executed at predetermined intervals, for instance, 10 milliseconds.

Logic flow starts and goes to step S1 in which an engine operating condition (that is, the detection signals of engine speed sensor 17, accelerator opening sensor 18, etc.) is read in.

In step S2, the PM accumulation amount is estimated. A generally known method of estimating the PM accumulation amount may be used. For instance, the PM accumulation amount can be estimated by previously mapping a relationship between the exhaust gas pressure and the PM accumulation amount and then retrieving the map using the exhaust gas pressure detected by exhaust gas pressure sensor 19, or can be estimated by previously mapping a relationship between engine speed and engine load (i.e., fuel injection amount) and a PM discharge amount and integrating the PM discharge amounts from the time at which regeneration of DPF 13 (hereinafter also referred to as DPF regeneration) is carried out.

In step S3, it is judged whether or not idling operation flag St_Idel is 0. The idling operation flag St_Idel is set at 1 when an idling operation is carried out and set at 0 when the idling operation is not carried out. When the answer in step S3 is NO, indicating that the idling operation is carried out, the logic flow proceeds to a subroutine shown in FIG. 3. When the answer in step S3 is YES, indicating that the idling operation is not carried out, the logic flow proceeds to step S4.

In step S4, it is judged whether or not DPF regeneration mode flag "reg" is 0. The DPF regeneration mode flag "reg" is set at 1 when DPF regeneration in a DPF regeneration mode is executed. The DPF regeneration mode flag "reg" is set at 0 when the DPF regeneration in the DPF regeneration mode is not executed. As generally known, the DPF regeneration is executed by periodically removing the PM (mainly soot) trapped and accumulated in a DPF by burning, etc. in order to allow continuous use of the DPF. In this embodiment, the DPF regeneration is performed by combination of oxidation catalyst 11 as generally known and post injection of fuel. The post injection serves for raising the exhaust gas temperature and is carried out at a non-ignition timing later than a compression top dead center (i.e., top dead center of a compression stroke) after main injection of fuel is conducted near at the compression top dead center. However, the method of regenerating the DPF is not limited to the combination of oxidation catalyst 11 and the post injection according to this embodiment, and may be a DPF regenerating method using a heater or the like. When the answer in step S4 is NO (i.e., "reg"=1), indicating that the DPF regeneration is under execution, the logic flow proceeds to a subroutine shown in FIG. 4. When the answer in step S4 is YES (i.e., "reg"=0), indicating that the DPF regeneration is not under execution, the logic flow proceeds to step S5.

In step S5, it is judged whether or not temperature drop promotion flag DPF_T_down is 0. The temperature drop promotion flag DPF_T_down is set at 1 when processing of temperature drop promotion is executed. The processing of temperature drop promotion is executed to promote dropping the temperature of DPF 13 during the idling operation carried out during the DPF regeneration, in order to suppress a rapid increase in crystallization (a rapid crystal growth) of the PM. In this embodiment, a large amount of low temperature gas is supplied to DPF 13 to thereby quickly drop the temperature of DPF 13 by increasing a target idle speed under idle speed control. When the answer in step S5 is NO (i.e., DPF_T_down=1), indicating that the processing of promotion of the temperature drop of DPF 13 is executed, the logic flow proceeds to a subroutine shown in FIG. 5. When the answer in step S5 is YES (i.e., DPF_T_down=0), indicating that the processing of promotion of the temperature drop of DPF 13 is not executed, the logic flow proceeds to step S6.

Figure 3:
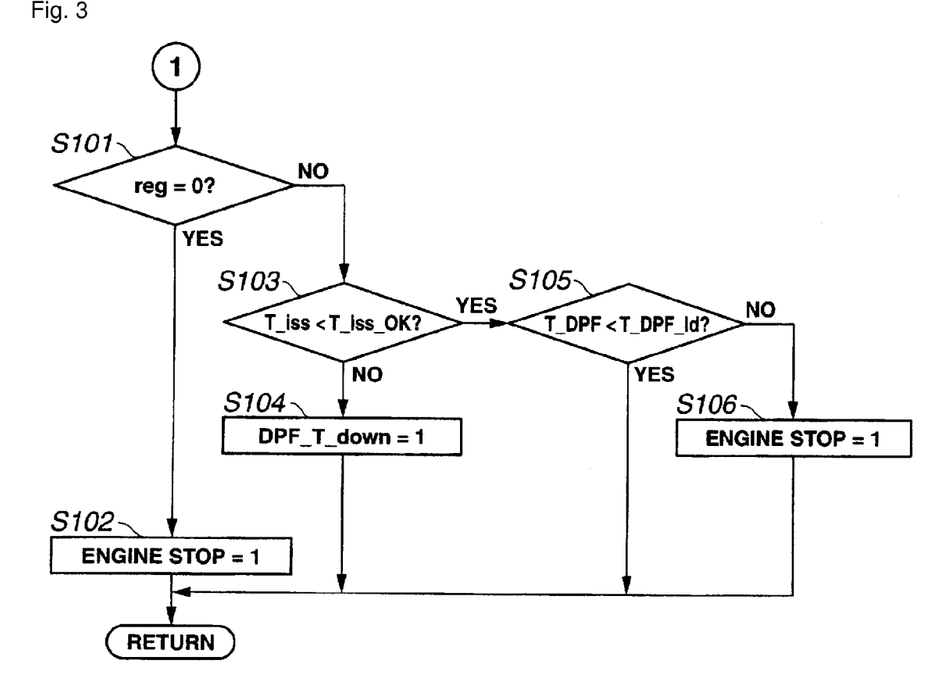
FIG. 3 is a flowchart of a subroutine of the routine shown in FIG. 2.
Figure 6:
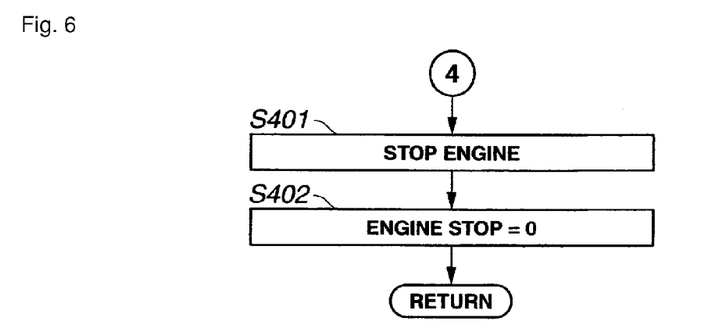
FIG. 6 is a flowchart of a subroutine of the routine shown in FIG. 2.

In step S6, it is judged whether or not engine stop flag (idling stop flag) is 0. The engine stop flag is set at 1 when a request for engine stop (idling stop) is made, that is, when an idling stop condition is fulfilled. When the answer in step S6 is NO, indicating that the engine stop flag is 1 and the request for engine stop by idling stop is made, the logic flow proceeds to a subroutine shown in FIG. 6. As shown in FIG. 6, in step S401, engine stop, i.e., idling stop is started to stop fuel injection when the engine stop flag is 1. In step S402, the engine stop flag is set at 0. The processing of step S6 shown in FIG. 2 and the processing of the subroutine shown in FIG. 6 are executed in a case where the request for engine stop is made under a condition that the answers in step S3 and step S4 are YES, that is, under a condition that the idling operation is not carried out and the DPF regeneration is not executed. Meanwhile, the processing of idling stop which is executed by interrupting the DPF regeneration is explained later by referring to steps S103 to S106 of the subroutine as shown in FIG. 3. Further, the temperature of DPF 13 and the idling stop time are always monitored during the idling stop subsequent to the DPF regeneration, and stored in a suitable memory in ECU 9 for use in estimation of a degree of crystallization (crystal growth) of the PM in DPF 13 as explained later.

Figure 7:
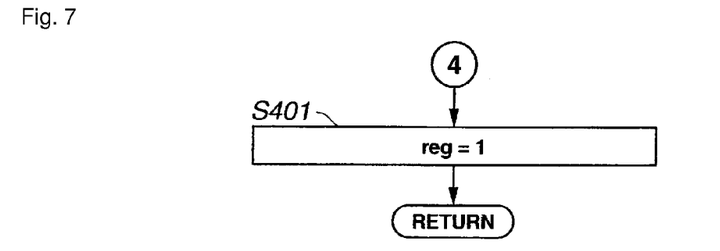
FIG. 7 is a flowchart of a subroutine of the routine shown in FIG. 2.

When the answer in step S6 is YES, indicating that the engine stop flag is 0 and the request for engine stop (idling stop) is not made, the logic flow proceeds to step S7. In step S7, it is judged whether or not the PM accumulation amount is not more than predetermined value PM1. When the answer in step S7 is NO, indicating that the PM accumulation amount exceeds the predetermined value PM1, it is judged that the time of execution of the DPF regeneration is reached, and the logic flow proceeds to a subroutine shown in FIG. 7. As shown in FIG. 7, in step S501, the DPF regeneration mode flag "reg" is set at 1 so that a request for DPF regeneration is made to start the DPF regeneration. When the answer in step S7 is YES, indicating that the PM accumulation amount is not more than the predetermined value PM1, the logic flow is ended.

FIG. 3 is a flowchart of the subroutine which is executed by ECU 9 during the idling operation. In step S101, it is judged whether or not the DPF regeneration mode flag "reg" is 0. When the answer in step S101 is YES, indicating that the DPF regeneration mode is not performed, the logic flow proceeds to step S102. When the answer in step S101 is NO, indicating that the DPF regeneration mode is performed, the logic flow proceeds to step S103.

In step S102, the engine stop flag is set at 1. That is, in a case where the idling operation is carried out during the time at which the DPF regeneration is not executed, the request for idling stop is quickly outputted to start the idling stop.

In step S103, it is judged whether or not PM crystallization T_iss which indicates a degree of crystallization (crystal growth) of the PM is less than predetermined crystallization threshold value T_iss_OK. The PM crystallization varies in accordance with a cumulative sum of an amount of heat to which the PM in DPF 13 is exposed and a time of exposure to the heat. In a case where the idling stop time during which the temperature of DPF 13 is raised is prolonged, the PM crystallization (crystal growth) begins to rapidly increase from the time at which the PM crystallization reaches a certain temperature value (near the predetermined crystallization threshold value T_iss_OK). This results in an increase in fire retardancy of the PM, thereby causing an adverse influence on the DPF regeneration. That is, this crystallization threshold value T_iss_OK may be appropriately set at a value lower than the value at which crystallization (crystal growth) of the PM rapidly proceeds, in order to suppress such an adverse influence on a DPF regeneration efficiency due to the rapid progress of crystallization (crystal growth) of the PM. When the answer in step S103 is YES, indicating that the PM crystallization T_iss is less than the predetermined crystallization threshold value T_iss_OK, the logic flow proceeds to step S105. When the answer in step S103 is NO, indicating that the PM crystallization T_iss is not less than the predetermined crystallization threshold value T_iss_OK, it is judged that if the idling operation is still continued, the PM crystallization (crystal growth) rapidly increases, and the logic flow proceeds to step S104.

In step S104, the temperature drop promotion flag DPF_T_down is set at 1 in order to drop the temperature of DPF 13. As a result, the processing of temperature drop promotion is executed without carrying out the idling stop, that is, with continuing the idling operation.

In step S105, it is judged whether or not when shifting to the idling operation is carried out during the DPF regeneration, the temperature of DPF 13 (hereinafter also referred to as DPF temperature) T_DPF is less than predetermined temperature T_DPF_Id which is not less than a DPF temperature at the time at which shifting to the idling operation is carried out.

Figure 8:
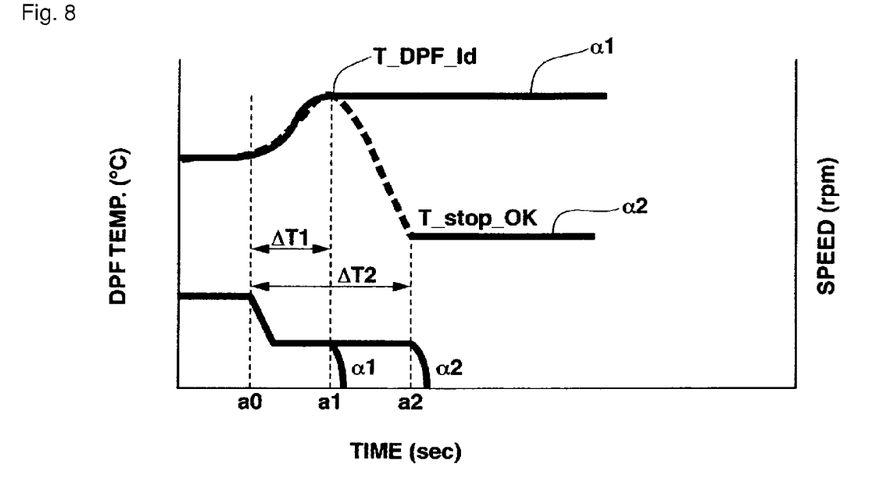
FIG. 8 is a timing chart showing a change in DPF temperature in an upper part thereof and a change in engine speed in a lower part thereof.

When the answer in step S105 is YES, indicating that the DPF temperature T_DPF is less than the predetermined temperature T_DPF_Id, it is judged that the DPF temperature is not sufficiently raised, and the idling operation is continued to raise the DPF temperature. That is, in this embodiment, predetermined delay time ΔT1 as shown in FIG. 8 is provided between the time at which shifting to the idling operation is carried out and the time at which the idling stop is started, such that the DPF temperature T_DPF becomes not less than the predetermined temperature T_DPF_Id.

When the answer in step S105 is NO, indicating that the DPF temperature T_DPF is not less than the predetermined temperature T_DPF_Id, it is judged that the DPF temperature T_DPF has reached the predetermined temperature T_DPF_Id by continuing the idling operation. Then, the logic flow proceeds to step S106. In step S106, the engine stop flag is set at 1 to start the idling stop.

Meanwhile, in step S105, a temperature value at the time at which the DPF temperature is changed from a rise thereof to a drop thereof, that is, a peak value of the DPF temperature at the time at which the DPF temperature is raised to the maximum by carrying out the idling operation may be determined by comparing a value of the DPF temperature determined in a current calculation to a value of the DPF temperature determined in the previous calculation, and idling stop may be started at the time at which the peak value of the DPF temperature is reached. Otherwise, more readily, idling stop may be started at the time at which the predetermined delay time $\Delta T1$ has elapsed.

Figure 4:
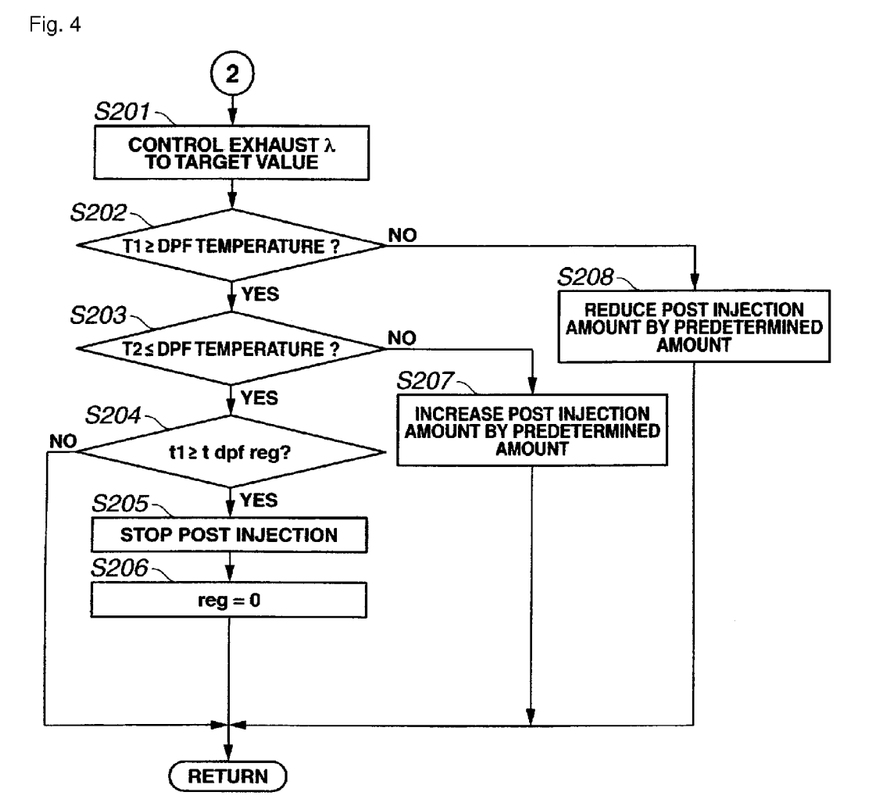
FIG. 4 is a flowchart of a subroutine of the routine shown in FIG. 2.
Figure 12:
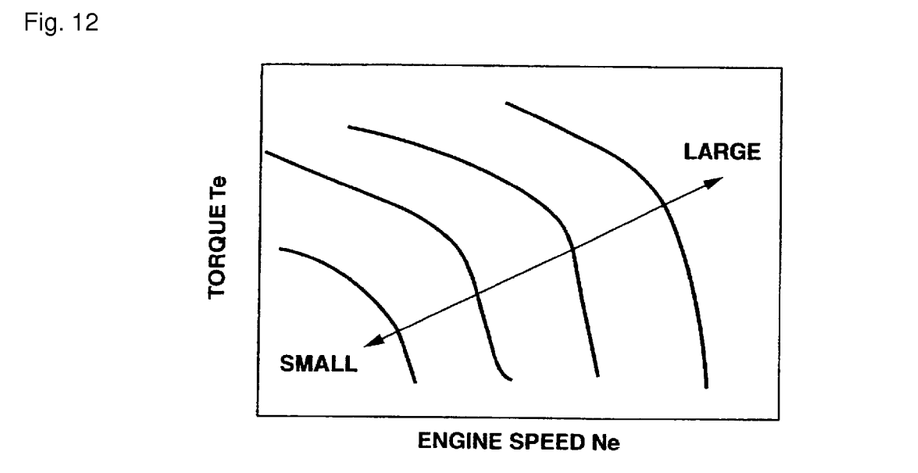
FIG. 12 is a map for setting a target intake air amount upon regeneration of the DPF.

FIG. 4 is a flowchart of the subroutine which is executed by ECU 9 during the DPF regeneration. In step S201, an exhaust air-fuel ratio (exhaust $\lambda$) is controlled in accordance with the PM accumulation amount (the PM trap amount) in DPF 13. For instance, in order to obtain a target exhaust $\lambda$, an intake air amount is retrieved on the basis of engine speed Ne and torque Te by looking up a map shown in FIG. 12, and controlled by using intake throttle valve 8.

In step S202, it is judged whether or not the DPF temperature is not more than upper limit value T1 during the DPF regeneration. When the answer in step S202 is NO, indicating that the DPF temperature is more than the upper limit value T1, the logic flow proceeds to step S208. In step S208, an amount of the post injection serving for the DPF regeneration is reduced by a predetermined amount in order to drop the DPF temperature. When the answer in step S202 is YES, the logic flow proceeds to step S203 in which it is judged whether or not the DPF temperature is not less than lower limit value T2 during the DPF regeneration. When the answer in step S203 is NO, indicating that the DPF temperature is less than the lower limit value T2, the logic flow proceeds to step S207. In step S207, the amount of the post injection is increased by a predetermined amount in order to raise the DPF temperature. Thus, during the DPF regeneration, the amount of the post injection is controlled to reduce and increase such that a value of the DPF temperature is within the appropriate range between the upper limit value T1 and the lower limit value T2.

When the answer in step S203 is YES, the logic flow proceeds to step S204. In step S204, it is judged whether or not DPF regeneration time t1 is not less than predetermined time tdpfreg. When the answer in step S204 is YES, indicating that the DPF regeneration time t1 has reached the predetermined time tdpfreg, it is judged that the PM trapped in DPF 13 is fully burned and removed from DPF 13. The logic flow then proceeds to step S205 in which the post injection is stopped, and the DPF regeneration is terminated. In step S206, the DPF regeneration mode flag "reg" is set at 0. The judgment of termination of the DPF regeneration is not limited to this processing of step S204. For instance, in a case where it is judged that exhaust gas pressure becomes lower than a predetermined value, the DPF regeneration may be terminated.

Figure 13:
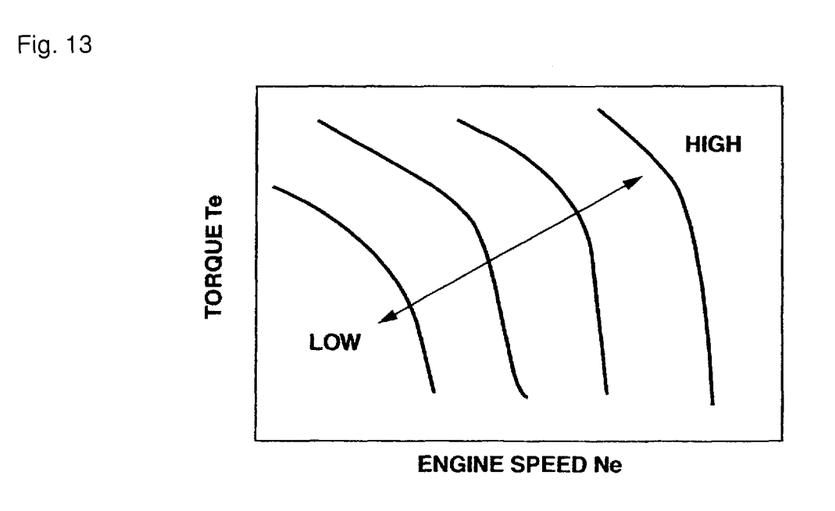
FIG. 13 is a map for setting a threshold value of exhaust gas pressure for judging a time of terminating (starting) regeneration of the DPF.

FIG. 13 shows an example of a map for setting a threshold value of exhaust gas pressure on the basis of engine speed Ne and torque Te, which is used for judgment of the DPF regeneration start time (or the DPF regeneration termination time). Meanwhile, the threshold value for judgment of the DPF regeneration start time and the threshold value for judgment of the DPF regeneration termination time are different from each other, and therefore, individual maps to set the respective threshold values are to be given separately.

Figure 5:
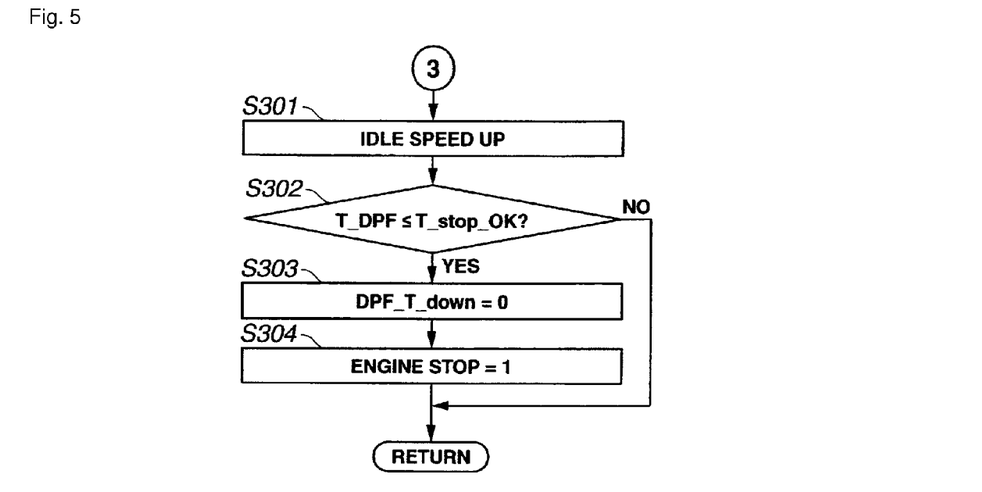
FIG. 5 is a flowchart of a subroutine of the routine shown in FIG. 2.

FIG. 5 is a flowchart of the subroutine of the processing of DPF temperature drop promotion which is executed by ECU 9 for suppressing a rapid increase in crystallization (a rapid crystal growth) of the PM. In step S301, an idle speed is increased in order to promote drop of the DPF temperature by increasing the amount of exhaust gas passing through DPF 13. That is, a target idle speed set under idle speed control is corrected to an increase side.

In step S302, it is judged whether or not the DPF temperature T_DPF is not more than predetermined value T_stop_OK (for instance, 500° C. to 550° C.) at which crystal growth of the PM can be suppressed. When the answer in step S302 is YES, indicating that the DPF temperature T_DPF is dropped to the predetermined value T_stop_OK or less, the logic flow proceeds to step S303. In step S303, the temperature drop promotion flag DPF_T_down is set at 0. Then, the logic flow then proceeds to step S304 in which the engine stop flag is set at 1 to start idling stop. Thus, in a case where shifting to the idling operation is carried out during the DPF regeneration and the degree of crystallization (crystal growth) of the PM is not less than the predetermined crystallization threshold value for the PM, the idling operation is continued for time $\Delta T2$ in which the DPF temperature is dropped to the predetermined value T_stop_OK or below as shown in FIG. 8, and the idle speed during the idling operation is increased to thereby promote the DPF temperature drop. As a result, it is possible to quickly drop the DPF temperature and suppress and avoid increase in degree of crystallization (crystal growth) of the PM in DPF 13.

The specific construction, functions and effects of the exhaust gas purifying apparatus according to the embodiment are explained as follows by referring to FIG. 8 to FIG. 11.

(1) FIG. 8 is a timing chart showing a change in DPF temperature and a change in engine speed under the control of this embodiment. As indicated by characteristic curves $\alpha1$ shown in FIG. 8, even when an idling stop condition is fulfilled, start of idling stop is prohibited during the predetermined delay time $\Delta T1$ from the time a0 at which a request for idling stop is made during the DPF regeneration to the time a1 at which the idling stop is started. That is, execution of the idling stop is delayed by the predetermined delay time $\Delta T1$, and an idling operation is continued until the time a1. As explained above, since an excess air ratio is high during the idling operation, excessive oxygen and the PM, specifically soot in DPF 13 are reacted to thereby cause a temporary rise of the DPF temperature. Further, the idling stop is started at the time a1 at which the DPF temperature becomes not less than the DPF temperature at the time a0 at which the request for idling stop is made. Thus, the DPF regeneration by post injection is forcibly interrupted at least at the time a1 at which the idling stop is started. Otherwise, the DPF regeneration by post injection may be interrupted at the time a0 at which the request for idling stop is made.

When shifting to idling stop is carried out, exhaust gas is prevented from passing through DPF 13 so that the DPF temperature is not remarkably dropped to thereby keep DPF 13 at a high temperature value. Accordingly, when engine 1 is automatically restarted from the idling stop, the DPF temperature has already reached the regeneration allowable temperature value or is kept at a sufficiently high value. Therefore, it is not necessary to considerably raise the DPF temperature, so that the DPF regeneration processing can be quickly restarted. By carrying out the idling stop in response to the request for idling stop even during the DPF regeneration, reduction of opportunity and frequency of carrying out idling stop can be suppressed. Further, by keeping the DPF temperature at a high value upon restarting engine 1 from the idling stop, the processing of DPF regeneration can be quickly started and an energy loss for raising the DPF temperature again can be suppressed.

(2) However, in a case where the idling operation is continued for a long time while keeping the temperature of the DPF high as described above, soot in the PM is transformed from amorphous state into crystallized graphite having a high fire retardancy. As a result, it will be difficult to accomplish regeneration of the DPF. Therefore, in this embodiment, the degree of crystallization (crystal growth) of the PM is estimated, and in a case where shifting to the idling operation is carried out during regeneration of the DPF and the degree of crystallization of the PM is less than the predetermined crystallization threshold value at which the crystal growth of the PM rapidly proceeds, the predetermined delay time $\Delta T1$ delayed from start time a0 of the idling operation is provided such that the temperature of the DPF can be raised as indicated by the characteristic curve $\alpha 1$ shown in FIG. 8. In other words, in a case where the degree of crystallization of the PM is not less than the predetermined crystallization threshold value, execution of idling stop which causes temperature rise of the DPF is prohibited. As a result, in a case where shifting to the idling operation is carried out during regeneration of the DPF, it is possible to surely suppress and avoid such a condition that the degree of crystallization of the PM becomes excessively high owing to the temperature rise of DPF 13 to thereby cause the difficulty in regeneration of DPF 13.

Figure 9:
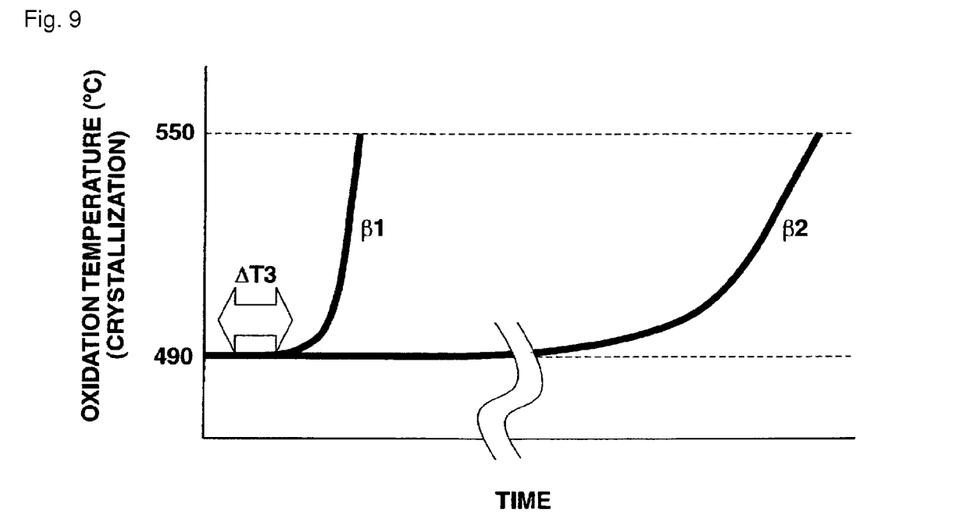
FIG. 9 is an explanatory diagram showing variation in crystallization (crystal growth) of a PM in accordance with a change in DPF temperature.
Figure 10:
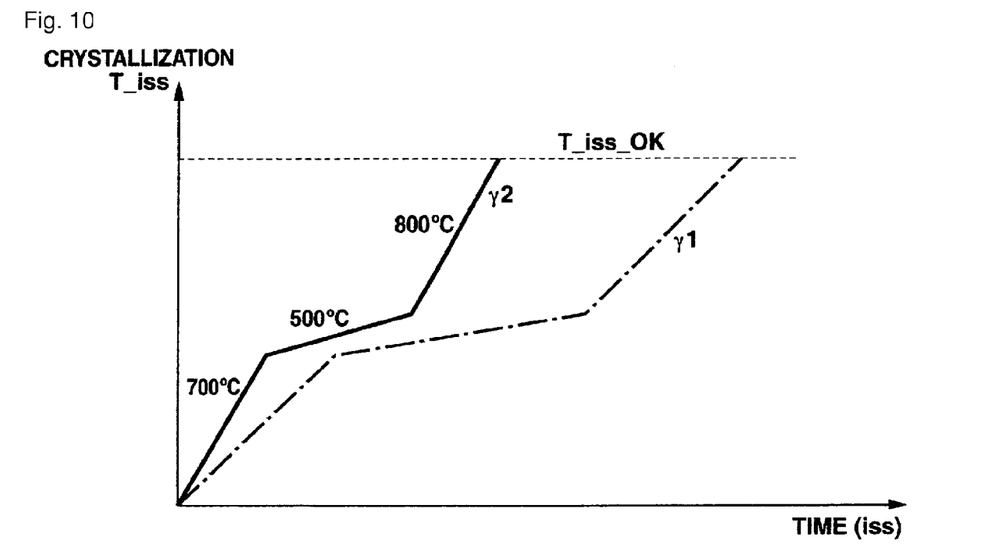
FIG. 10 is an explanatory diagram showing variation in crystallization (crystal growth) of the PM with time until reaching a threshold value of crystallization, in accordance with a change in DPF temperature and difference in fuel property.

(3) As shown in FIG. 9, crystallization of the PM which corresponds to oxidation temperature considerably depends on a cumulative sum of an amount of heat to which the PM in the DPF is exposed and a time of exposure to the heat has such a characteristic that crystal growth of the PM rapidly proceeds from the time at which the PM crystallization reaches a certain temperature value (near the predetermined crystallization threshold value T_iss_OK). The degree of crystallization (crystal growth) of the PM varies in accordance with the temperature of DPF 13, and increases as the temperature of DPF 13 becomes higher. Accordingly, as shown in FIG. 10, the degree of crystallization of the PM is estimated in accordance with the temperature of DPF 13 such that as the temperature of DPF 13 becomes higher, the degree of crystallization of the PM is increased. For instance, a degree of crystallization of the PM per unit time is obtained by multiplying by a coefficient which increases as the temperature of the DPF becomes higher. Then, the degree of crystallization of the PM per unit time is integrally accumulated during the idling stop time to thereby estimate the degree of crystallization of the PM with high accuracy. As a result, as shown in FIG. 9, the degree of crystallization of the PM as indicated by characteristic curve $\beta 1$ under a condition that the temperature of DPF 13 is high (for instance, about 700° C.) is rapidly increased for a time shorter than a time during which the degree of crystallization of the PM as indicated by characteristic curve $\beta 2$ under a condition that the temperature of DPF 13 is low (for instance, about 550° C.). Therefore, time $\Delta T3$ which is taken until the degree of crystallization of the PM reaches the crystallization threshold value is lowered.

(4) Further, the degree of crystallization (crystal growth) of the PM varies in accordance with a fuel property. For instance, as the fuel property is lighter (that is, as fuel density becomes smaller), the degree of crystallization of the PM is lowered. In contrast, as the fuel property is heavier (that is, as the fuel density becomes larger), the degree of crystallization of the PM is increased. Therefore, the degree of crystallization of the PM can be estimated in accordance with a fuel property such that as the fuel property is lighter, the degree of crystallization of the PM is lowered. Accordingly, as shown in FIG. 10, the degree of crystallization of the PM as indicated by characteristic curve $\gamma 1$ under a condition that the fuel property is light becomes slower than the degree of crystallization of the PM as indicated by characteristic curve $\gamma 2$ under a condition that the fuel property is heavy. As a result, the time which is taken until the degree of crystallization of the PM reaches the crystallization threshold value is increased.

(5) Further, in a case where shifting to the idling operation is carried out during the DPF regeneration and the degree of crystallization of the PM is not less than the crystallization threshold value of the PM, execution of idling stop which causes temperature rise of DPF 13 is prohibited. Further, the idling operation is prolonged without starting the idling stop during the predetermined time $\Delta T2$ as indicated by characteristic curve $\alpha 2$ in FIG. 8, and continued until the temperature of the DPF is dropped to predetermined value T_stop_OK (for instance, 500° C. to 550° C.) at which a large increase in crystallization of the PM is not generated. At time a2 at which the temperature of DPF 13 has dropped to the predetermined value T_stop_OK, the idling stop is started (see steps S103, S104 shown in FIG. 3 and FIG. 5). As a result, it is possible to surely suppress and avoid occurrence of such a condition that regeneration of DPF 13 rather becomes difficult due to rapid increase in crystallization (rapid crystal growth) of the PM which will be caused by temperature rise of DPF 13.

Figure 11:
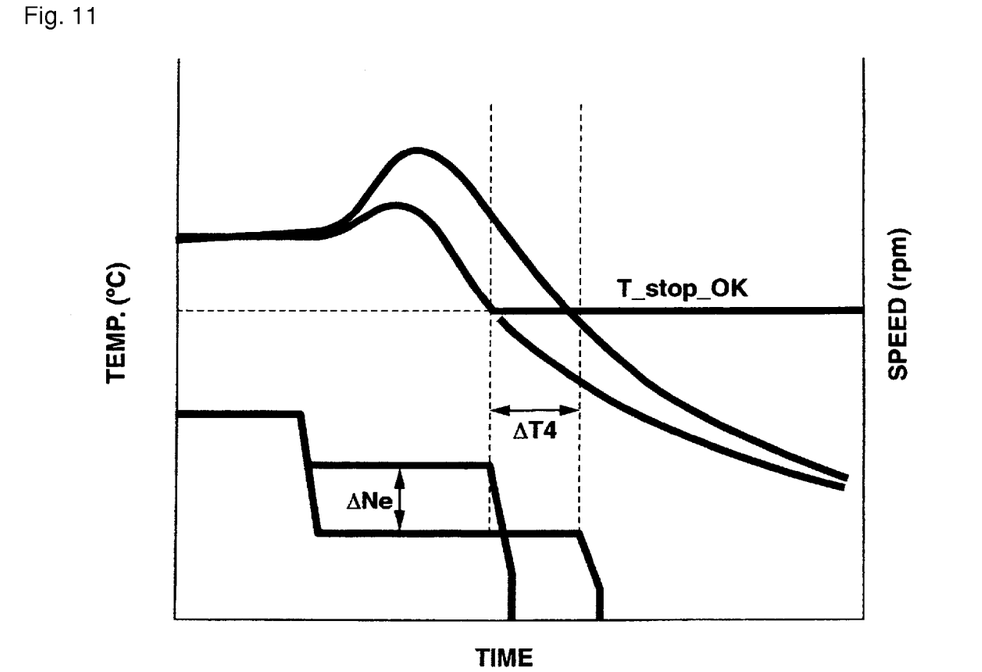
FIG. 11 is a timing chart showing change in DPF temperature in an upper part thereof and change in engine speed in a lower part thereof under DPF temperature drop promotion control.

(6) In addition, in a case where the degree of crystallization of the PM is not less than the crystallization threshold value, control of promoting drop of the temperature of DPF 13 is executed by increasing the engine speed during the idling operation (see step S301 as shown in FIG. 5) in order to quickly drop the temperature of DPF 13. Specifically, as shown in FIG. 11, a target idle speed under idle speed control is increased by predetermined amount $\Delta Ne$. As a result, an amount of the gas passing through DPF 13 during the idling operation can be increased to thereby promote drop of the temperature of DPF 13 and reduce predetermined time $\Delta T4$ taken until the temperature of DPF 13 is dropped to the predetermined value T_stop_OK.

This application is based on a prior Japanese Patent Application No. 2010-144512 filed on Jun. 25, 2010. The entire contents of the Japanese Patent Application No. 2010-144512 is hereby incorporated by reference.

Although the present invention has been described above by reference to a certain embodiment of the present invention and the modification, the present invention is not limited to the embodiment and the modification as described above. Variations of the embodiment and the modification as described above will occur to those skilled in the art in light of the above teachings. The scope of the present invention is defined with reference to the following claims.

The invention claimed is:

1. An exhaust gas purifying apparatus for a diesel engine, the diesel engine conducting idling stop to automatically stop the diesel engine in a case where a predetermined idling stop condition is fulfilled, the exhaust gas purifying apparatus comprising:
    a diesel particulate filter (DPF) disposed in an exhaust system in the diesel engine to trap a particulate matter in exhaust gas discharged from the diesel engine; and
    a controller configured to control:
    a DPF regeneration section to execute regeneration of the DPF by raising a temperature of the DPF in a case where a predetermined DPF regeneration condition is fulfilled;
    a DPF regeneration interruption and restart section to interrupt the regeneration of the DPF, to execute idling stop, to automatically restart the diesel engine and then to restart the regeneration of the DPF; and
    an idling stop delay section to delay execution of the idling stop until a temperature of the DPF at a time at which the idling stop is started becomes not less than a temperature of the DPF at a time at which shifting to an idling operation is carried out even in a case where the predetermined idling stop condition is fulfilled, when shifting to the idling operation is carried out during the regeneration of the DPF.

2. The exhaust gas purifying apparatus as claimed in claim 1, further comprising a crystallization estimation section, the controller configured to control the crystallization estimation section to estimate a degree of crystallization of the particulate matter in the DPF which varies in accordance with an amount of heat to which the particulate matter trapped in the DPF is exposed, wherein the controller is configured to control the idling stop delay section to delay the execution of the idling stop in a case where shifting to the idling operation is carried out during the regeneration of the DPF and the degree of crystallization of the particulate matter is less than a predetermined crystallization threshold value at which crystal growth of the particulate matter rapidly proceeds to thereby raise a temperature of the DPF.

3. The exhaust gas purifying apparatus as claimed in claim 2, wherein the controller is configured to control the crystallization estimation section to estimate the degree of crystallization of the particulate matter in accordance with a temperature of the DPF such that as the temperature of the DPF becomes higher, the degree of crystallization of the particulate matter is increased.

4. The exhaust gas purifying apparatus as claimed in claim 2, wherein the controller is configured to control the crystallization estimation section to estimate the degree of crystallization of the particulate matter in accordance with a fuel property such that as the fuel property is lighter, the degree of crystallization of the particulate matter is lowered.

5. The exhaust gas purifying apparatus as claimed in claim 2, wherein in a case where the degree of crystallization of the particulate matter is not less than the predetermined crystallization threshold value when shifting to the idling operation is carried out during the regeneration of the DPF, the controller is configured to control the idling operation to be prolonged without starting the idling stop and to be continued until the temperature of the DPF is dropped to not more than a predetermined value.

6. The exhaust gas purifying apparatus as claimed in claim 5, wherein the controller is configured to control an engine speed to be increased during the idling operation in a case where the degree of crystallization of the particulate matter is not less than the predetermined crystallization threshold value when shifting to the idling operation is carried out during the regeneration of the DPF.

7. The exhaust gas purifying apparatus as claimed in claim 5, wherein the predetermined value is a temperature value at which the crystal growth of the particulate matter is suppressed.

8. The exhaust gas purifying apparatus as claimed in claim 3, wherein the controller is configured to control the crystallization estimation section to estimate the degree of crystallization of the particulate matter in accordance with a fuel property such that as the fuel property is lighter, the degree of crystallization of the particulate matter is lowered.

9. The exhaust gas purifying apparatus as claimed in claim 3, wherein in a case where the degree of crystallization of the particulate matter is not less than the predetermined crystallization threshold value when shifting to the idling operation is carried out during the regeneration of the DPF, the controller is configured to control the idling operation to be prolonged without starting the idling stop and to be continued until the temperature of the DPF is dropped to not more than a predetermined value.

10. The exhaust gas purifying apparatus as claimed in claim 4, wherein in a case where the degree of crystallization of the particulate matter is not less than the predetermined crystallization threshold value when shifting to the idling operation is carried out during the regeneration of the DPF, the controller is configured to control the idling operation to be prolonged without starting the idling stop and to be continued until the temperature of the DPF is dropped to not more than a predetermined value.

* * * * *